(12) United States Patent
Vas

(10) Patent No.: US 8,672,270 B2
(45) Date of Patent: Mar. 18, 2014

(54) TIE DOWN AND JACK FITTING ASSEMBLY FOR HELICOPTER

(75) Inventor: Victoria L. Vas, Moulton, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 137 days.

(21) Appl. No.: 13/543,217

(22) Filed: Jul. 6, 2012

(65) Prior Publication Data

US 2014/0008494 A1    Jan. 9, 2014

(51) Int. Cl.
*B64C 1/00*    (2006.01)
(52) U.S. Cl.
USPC .................. 244/129.1; 244/137.1; 410/101; 248/499
(58) Field of Classification Search
USPC ............... 244/129.1, 118.1, 118.2, 131, 137; 410/106, 101, 107, 112, 113, 116, 108
See application file for complete search history.

(56) References Cited

U.S. PATENT DOCUMENTS

| | | | | |
|---|---|---|---|---|
| 2,962,245 | A * | 11/1960 | Molzan et al. | 244/115 |
| 3,051,419 | A * | 8/1962 | Weiland et al. | 244/137.1 |
| 3,155,373 | A * | 11/1964 | Rae | 254/45 |
| 4,378,098 | A * | 3/1983 | Evans | 244/137.1 |
| 4,593,871 | A * | 6/1986 | Nichols | 244/129.1 |
| 6,481,365 | B1 * | 11/2002 | Currie et al. | 116/67 R |
| 8,052,090 | B1 * | 11/2011 | Nelson | 244/137.4 |
| 8,197,166 | B2 * | 6/2012 | Stull et al. | 410/106 |
| 8,360,385 | B2 * | 1/2013 | Burg et al. | 248/499 |
| 2005/0015940 | A1 * | 1/2005 | Stafford | 24/135 N |
| 2005/0060951 | A1 * | 3/2005 | Kalnay | 52/641 |
| 2005/0121569 | A1 * | 6/2005 | Willey | 248/168 |
| 2008/0260487 | A1 * | 10/2008 | Grasso | 410/111 |
| 2009/0294744 | A1 * | 12/2009 | Tharp | 254/227 |
| 2011/0017792 | A1 * | 1/2011 | Stull et al. | 224/406 |
| 2011/0057089 | A1 * | 3/2011 | Grasso | 248/500 |
| 2011/0210227 | A1 * | 9/2011 | Burg et al. | 248/499 |
| 2011/0284716 | A1 * | 11/2011 | Silvio et al. | 248/503 |
| 2012/0153080 | A1 * | 6/2012 | Duggar et al. | 244/118.1 |

* cited by examiner

*Primary Examiner* — Christopher P Ellis
*Assistant Examiner* — Medhat Badawi
(74) *Attorney, Agent, or Firm* — Michael K. Gray

(57) ABSTRACT

The present invention is an assembly (100) for use as a jack contact point and a secure tie-down location for a helicopter. The assembly includes a hollow waffled dome element (110) having support elements (116A, 116B, 116C, 116D, 116E, 116F) which form attachment openings or securing holes (118A, 118B, 118C) between the upper and lower rims of the dome element. A jack securing mechanism (130) is provided with a threaded screw region (132) which connects to a jack mounting region (134). The threaded screw region extends through a hole (122) in a planar top (120) of the dome element (110) so as to be secured to a planar region of a structurally suitable location on the helicopter. The jack mounting region is shaped to accommodate a jack used to raise the helicopter. The attachment openings (118A, 118B, 118C) are used to accommodate secure tie-down of the helicopter.

9 Claims, 5 Drawing Sheets

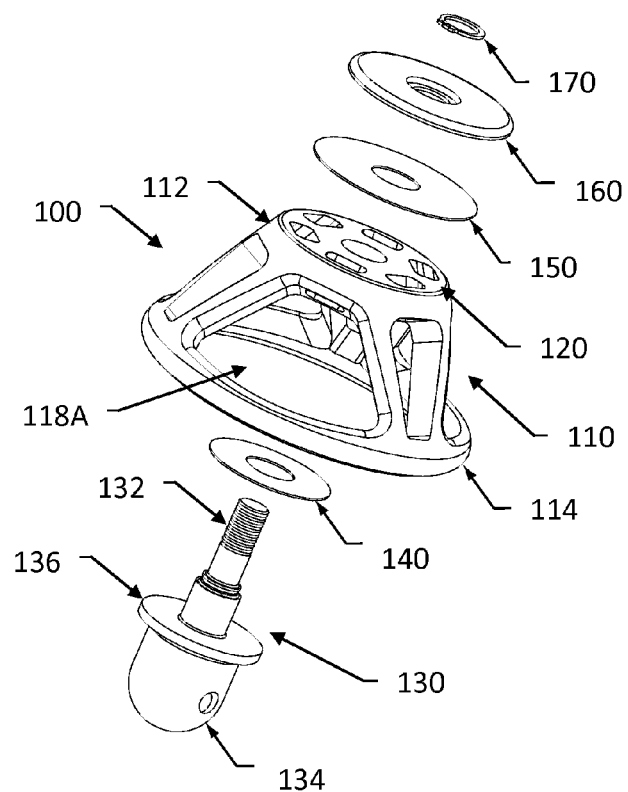
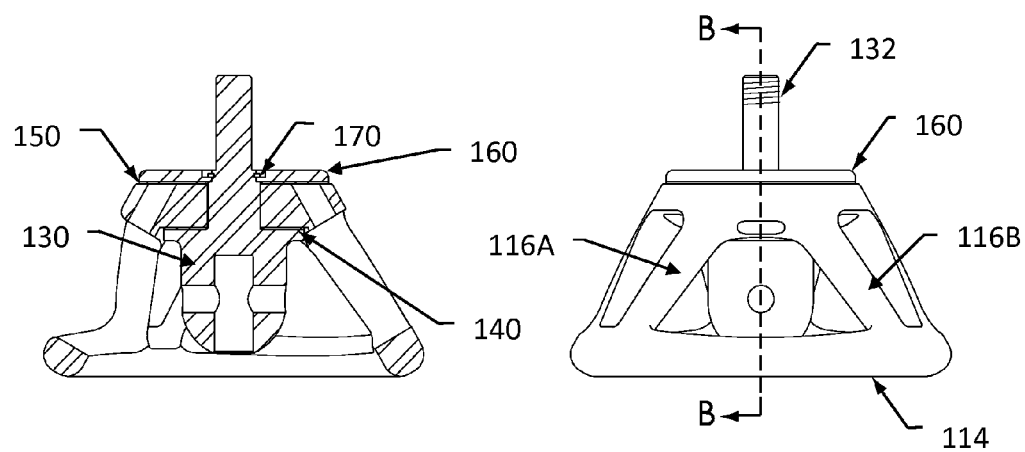
FIG. 4
FIG. 6
FIG. 5

US 8,672,270 B2

TIE DOWN AND JACK FITTING ASSEMBLY FOR HELICOPTER

DEDICATION CLAUSE

The Invention described herein may be manufactured, used and licensed by or for the U.S. Government for governmental purposes without the payment of any royalties thereon.

BACKGROUND OF THE INVENTION

I. Field of the Invention

The present invention pertains to aircraft hardware accessories used for jacking or tying down an aircraft. More particularly, the present invention pertains to a hardware device adapted to be used as a tie-down or jack connection point of a helicopter.

II. Discussion of the Background

Aircraft such as the CH-47 helicopter require locations or points on the bottom of the aircraft that are utilized to jack the aircraft during maintenance or weighing. In the CH-47, two of the jacking locations are positioned just forward of the aft landing gears on the right and left hand sides of the aircraft. Structurally secure locations such as those forward of the aft landing gears of the CH-47 aircraft are sometimes referred to as hard point locations. These hard point locations have been utilized as jacking locations and tie down locations to achieve secure tie-down of the aircraft, such as, for example, when the aircraft is transported.

In the past, two sets of hardware have been utilized to accommodate the hard point locations forward of the aft landing gears, depending upon the task at hand. One set of hardware was used for jacking, i.e., a jacking adapter, and another set of hardware was used for tie-down and securing purposes, i.e., a tie-down adapter.

Having two sets of hardware necessitated changing the hardware to accommodate the purpose at hand and often resulted in losing the entire hardware item, e.g., the jacking adapter, or losing accompanying parts and bolts. Thus, the required adapter was often not on hand when needed.

SUMMARY OF THE INVENTION

The present invention provides a multi-use attachment or assembly for realizing jacking and securing functions. The present invention is a mechanical assembly for attachment to an aircraft such as a helicopter at a location of the aircraft which is structurally suitable for attachment of a jacking mechanism. The assembly includes a hollow waffled dome element having a top rim and a bottom rim which are connected by a plurality of support elements such that the top rim, the bottom rim and the plurality of support elements define attachment openings. The hollow waffled dome element has a planar top with a center hole through the planar top. The planar top, the top rim, the bottom rim and support elements of the hollow waffled dome element are of integral construction.

A jack securing mechanism is provided with a threaded screw region which connects to a jack mounting region, with the threaded screw region being inserted through the center hole of the planar top. A first washer is inserted and positioned around the threaded screw region within the hollow waffle dome element. The first washer rests upon a platform of the jack securing mechanism, with the platform being located between the threaded screw region and the jack mounting region. The first washer makes contact with the planar top. A second washer is positioned outside the hollow waffle dome element and contacts the planar top. At least a portion of the threaded screw region of the jack securing mechanism extends through the second washer.

An adapter ring contacts the second washer, with at least a portion of the threaded screw of the jack securing mechanism extending through the adapter ring. A retainer ring contacts the adapter ring and securely connects to the threaded screw region of the jack securing mechanism such that when the threaded screw region is screwed into the location of the aircraft structurally suitable for attachment of a jacking mechanism, the hollow waffled dome element and the jack securing mechanism become securely attached to the location of the aircraft structurally suitable for attachment of a jacking mechanism.

The jack mounting region of the jack securing mechanism is shaped to securely accommodate a jack. The plurality of support elements and bottom rim, which define the attachment openings, are positioned to accommodate tie-down ropes.

DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4 is an exploded view of the attachment assembly of the present invention.

FIG. 5 is a side view of the attachment assembly of the present invention.

FIG. 6 is a sectional view taken along line B-B of FIG. 5.

DESCRIPTION OF THE INVENTION

Figure 1:
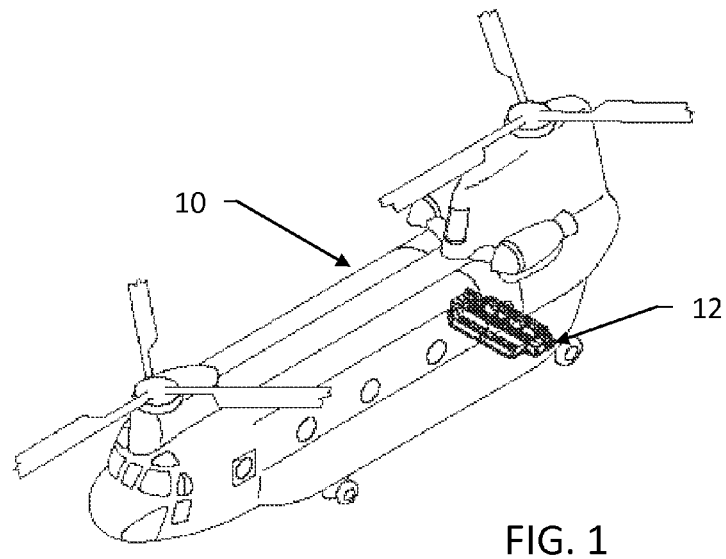
FIG. 1 is a perspective, partial x-ray view of a helicopter 10 and hardpoint section 12 extending the longitudinal width of the helicopter, with the assembly attachment of the present invention to be affixed at the longitudinal periphery of the hardpoint section at the exterior of the helicopter.
Figure 2:
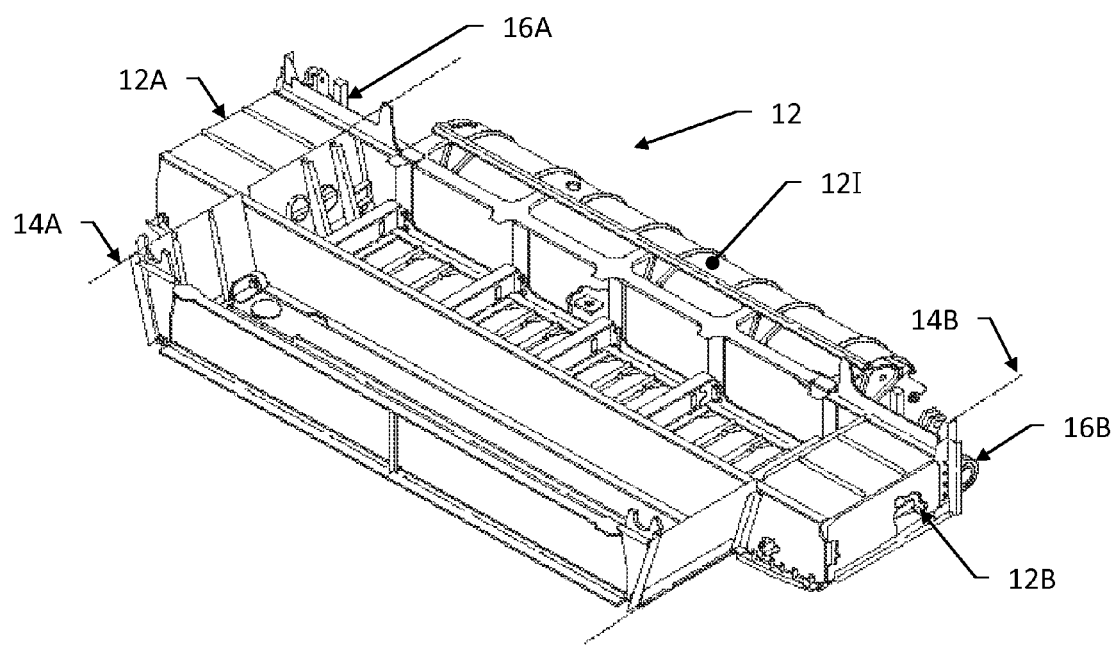
FIG. 2 is a perspective view of the hardpoint section 12 of the aircraft with the attachment of the present invention being mounted on the lateral outside periphery of section 12.

With reference to FIG. 1, an aircraft or helicopter 10 is provided with a hardpoint section 12 which has an interior section 121 positioned width-wise between the skin or airframe of the helicopter which is identified by dashed lines 14A, 14B in FIG. 2. Exterior regions 12A, 12B of the hardpoint section 12 are located to the exterior of the airframe on both lateral sides of the aircraft. In FIG. 1, the hardpoint section 12 is located just forward of the aft landing gear.

Figure 3:
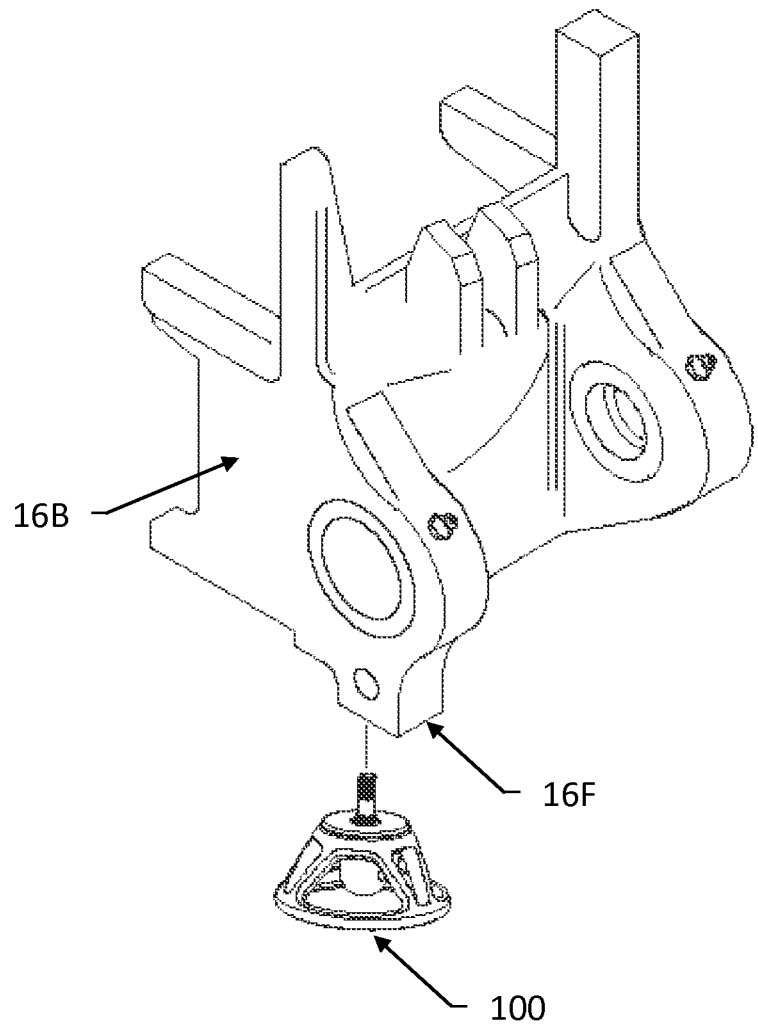
FIG. 3 is a perspective, exploded illustration showing the outside periphery of the hardpoint section where the attachment assembly 100 of the present invention is mounted a hardpoint location.

With reference to FIGS. 2 and 3, the hardpoint section 12 has hardpoint locations 16A, 16B which are respectively located and connected to exterior regions 12A and 12B of the hardpoint section 12. In FIG. 3, the exploded view demonstrates that the tie down and jack fitting assembly 100 of the present invention is to have a flush contact connection with the flat surface 16F on the underside of the hardpoint location 16B. In a like manner, an assembly 100 according to the present invention would be connected to the hardpoint location 16A on the other side of the aircraft.

In FIG. 4, the tie-down jack-fitting assembly 100 of the present invention has a hollow waffled dome element 110 having a top rim 112, and a bottom rim 114. A plurality of support elements 116A, 116B, 116C, 116D, 116E, 116F (FIGS. 5, 7 and 8) connect the top rim 112 with the bottom rim 114 and define attachment openings 118A, 118B, 118C. The hollow waffled dome element 110 has a planar top 120 having a center hole 122. The planar top 120 connects to the top rim 112. The top rim 112, bottom rim 114, support elements 116A, 116B, 116C, 116D, 116E, 116F, and planar top 120 are integrally formed from cast or machined metal or other suitably strong material.

Figure 7:
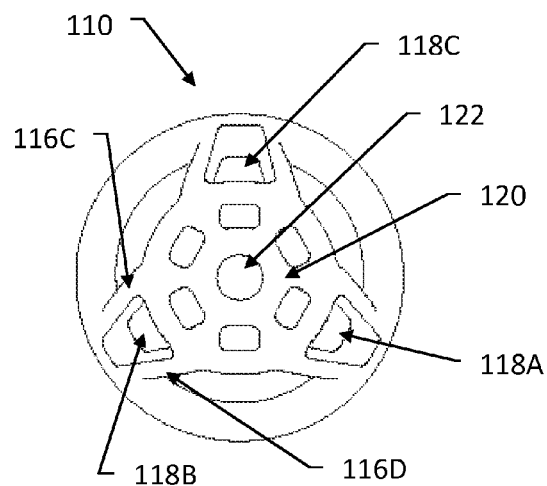
FIG. 7 is a side view of the waffled cone attachment member of the attachment assembly of the present invention.
Figure 8:
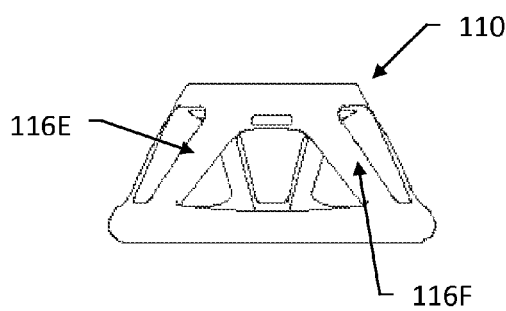
FIG. 8 is a top view of the of the waffled cone attachment member of the present invention.

Each of the support elements 116A, 116B, 116C, 116D, 116E, 116F makes an angle of less than 90 degrees with the bottom rim 114 of the waffled dome element 110. A jack securing mechanism 130 (FIGS. 4 and 11) has a threaded screw region 132 which connects to a jack contact or mounting region 134. The threaded screw region 132 is inserted through the center hole 122 in the planar top 120 (FIG. 7). A first washer 140 is inserted through and positioned around the threaded screw region 132.

Within the hollow dome element 110, the first washer 140 rests upon a platform 136 of the jack securing mechanism 130 with the platform 136 being located between the threaded screw region 132 and the jack mounting region 134. The jack mounting region is shaped to accommodate and fit with a jack.

Figure 9:
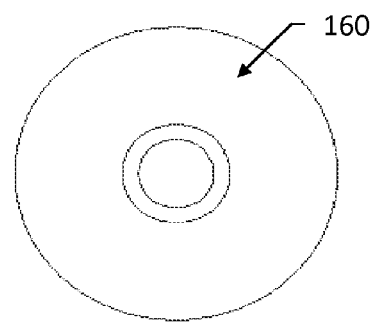
FIG. 9 is a top view of the retaining ring of the attachment assembly of the present invention.
Figure 10:
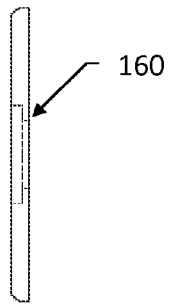
FIG. 10 is a side view of the retaining ring of the attachment assembly of the present invention.

A second washer 150 (FIGS. 5 and 6) is positioned outside the hollow waffle dome element 110 and contacts the planar top 120 with at least a portion of the threaded screw region 132 extending through the second washer. An adapter ring 160 (FIGS. 4, 9 and 10) contacts the second washer with at least a portion of the threaded screw region 132 extending through the adapter ring 160.

A retainer ring 170 (FIGS. 4 and 5) contacts the adapter ring 160 and securely connects to the threaded screw region of the jack securing mechanism 130 such that when the threaded screw region is screwed into the hardpoint location 16B on the exterior hardpoint location 12B, i.e., when the threaded screw region is screwed into the location of the aircraft structurally suitable for attachment of a jacking mechanism, the hollow waffled dome element and the jack securing mechanism become securely attached to the hardpoint location 12B.

When securely attached to the hardpoint location of the aircraft, the adapter ring 160 becomes flush with the planar or flat surface 16F on the underside of the hardpoint location 16B (FIG. 3).

Figure 11:
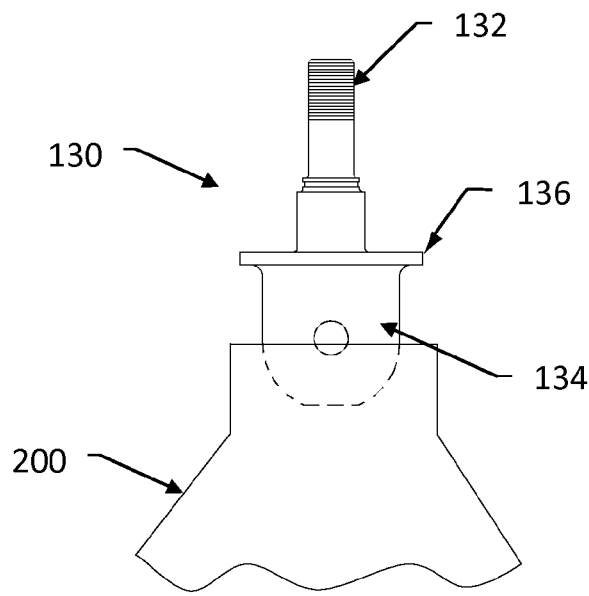
FIG. 11 is a side view of the jack point securing mechanism of the present invention.

In FIG. 11, a jack 200 connects to the jack mounting region 134 of the jack securing mechanism 130 with the jack mounting region 134 being shaped to accommodate the jack 200.

Figure 12:
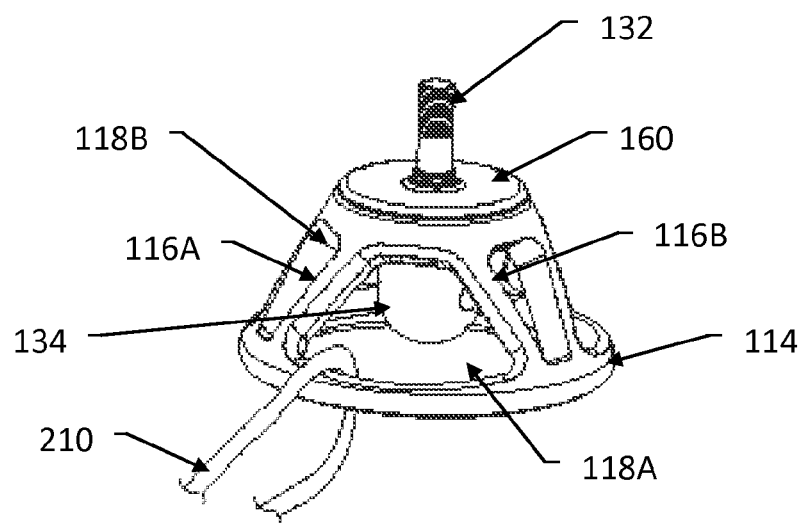

In FIG. 12, securing rope 210 is demonstrated as being insertable through attachment hole 118A so as to be secured to supports 116A or 116B or bottom rim 114.

The tie down and jack fitting assembly 100 of the present invention was designed to be used as a tie-down device on the U.S. Army Chinook CH-47 Cargo Helicopter; however, the teachings of the present invention are applicable to other helicopters and aircraft.

The benefit of the present invention is the incorporation of two unrelated parts, both necessary on the aircraft, into a single assembly. This reduces the loss of parts and decreases maintenance times so as to eliminate the need to change out parts.

Various modifications are possible without deviating from the spirit of the present invention. Accordingly, the scope of the invention is only limited by the claim language which follows hereafter.

What is claimed is:

1. An assembly (100) for attaching to an aircraft at a location of the aircraft which is structurally suitable for attachment of a jacking mechanism, said assembly comprising:

a hollow waffled dome element (110) having a top rim (112) and a bottom rim (114) which are connected by a plurality of support elements (116A, 116B, 116C, 116D, 116E, 116F) with said top rim, said bottom rim and said plurality of support elements defining attachment openings (118A, 118B, 118C), said hollow waffled dome element having a planar top (120) and center hole (122) extending through said planar top;

a jack securing mechanism (130) is provided with a threaded screw region (132) which connects to a jack mounting region (134), with the threaded screw region being inserted through said center hole (122);

a first washer (140) inserted and positioned around the threaded screw region (132) within said hollow waffle dome element (110) and resting upon a platform (136) of the jack securing mechanism with said platform being located between the threaded screw region (132) and said jack mounting region (134), said first washer (140) contacting said top rim (112);

a second washer (150) positioned outside said hollow waffle dome element (110) and contacting said top rim, at least a portion of said threaded screw region (132) extending through said second washer;

an adapter ring (160) contacting said second washer, at least a portion of said threaded screw region (172) extending through said adapter ring; and a retainer ring (170) contacting said adapter ring (160) and securely connecting to said threaded screw region (132) of said jack securing mechanism (130) such that when said threaded screw region is screwed into the location of the aircraft structurally suitable for attachment of a jacking mechanism said hollow waffled dome element (110), and said jack securing mechanism (130) become securely attached to the location of the aircraft structurally suitable for attachment of a jacking mechanism as well.

2. An assembly according to claim 1, wherein:
said adapter ring is secured flush to a flat surface on the location of the aircraft structurally suitable for attachment of a jacking mechanism.

3. An assembly according to claim 1, wherein:
said attachment openings and said plurality of support elements are used to secure said assembly to tie-down roping.

4. An assembly according to claim 1, wherein:
said hollow waffled dome element (110) is made from casted metal.

5. An assembly according to claim 1, wherein:
said aircraft is a helicopter.

6. An assembly according to claim 1, wherein:
said plurality of support elements extend upward from said bottom rim to said top rim of said hollow waffled dome element (110) such that each support element of said plurality of support elements and said bottom rim form an angle of less than 90 degrees.

7. An assembly according to claim 1, wherein:

said jack mounting region (134) of said jack securing mechanism (130) is shaped to securely accommodate a jack.

8. An assembly according to claim 1, wherein:

said planar top (120), said top rim (112), said bottom rim (114) and said plurality of support elements (116A, 116B, 116C, 116D, 116E, 116F) of said hollow waffled dome element (110) are of integral construction.

9. An assembly according to claim 1, wherein:

said hollow waffled dome element (110) is made from machined metal.

* * * * *

UNITED STATES PATENT AND TRADEMARK OFFICE
CERTIFICATE OF CORRECTION

| | | |
|---|---|---|
| PATENT NO. | : 8,672,270 B2 | Page 1 of 1 |
| APPLICATION NO. | : 13/543217 | |
| DATED | : March 18, 2014 | |
| INVENTOR(S) | : Victoria L. Vas | |

It is certified that error appears in the above-identified patent and that said Letters Patent is hereby corrected as shown below:

In the Specification

In the Description of the Drawings at column 2, line 55, insert the following paragraph.

--FIG. 12 is a perspective view of the attachment assembly of the present invention.--

Signed and Sealed this
Twentieth Day of May, 2014

Michelle K. Lee
*Deputy Director of the United States Patent and Trademark Office*